United States Patent [19]

Levine

[11] 4,122,494
[45] Oct. 24, 1978

[54] SYNCHRONIZATION FOR OSCILLATING OPTICAL BEAM DEFLECTING DEVICE

[75] Inventor: James L. Levine, Yorktown Heights, N.Y.

[73] Assignee: International Business Machines Corporation, Armonk, N.Y.

[21] Appl. No.: 810,839

[22] Filed: Jun. 28, 1977

[51] Int. Cl.² .................. H04N 1/24; H04N 3/08
[52] U.S. Cl. .................... 358/208; 358/230; 358/231; 358/264; 358/293
[58] Field of Search ............... 358/285, 208, 230, 231, 358/293, 264

[56] References Cited

U.S. PATENT DOCUMENTS

| | | | |
|---|---|---|---|
| 3,090,828 | 5/1963 | Bain | 358/230 |
| 3,835,249 | 9/1974 | Dattilo | 358/293 |
| 4,037,231 | 7/1977 | Broyles | 358/293 |
| 4,047,792 | 9/1977 | Dale | 358/285 |

Primary Examiner—Howard W. Britton

Attorney, Agent, or Firm—Pollock, Vande Sande & Priddy

[57] ABSTRACT

A display system includes an oscillating mirror for deflecting modulated optical energy. The system includes apparatus for indicating when the mirror has reached its travel end point in both directions. Images are written during mirror travel in one direction between said end points, and synchronizing apparatus is provided to allow an image to be written during mirror travel in a direction opposite said one direction in such a fashion that the images written during both directions of mirror travel are superimposed on each other. Apparatus is provided to measure the time elapsed between cessation of writing during mirror travel in one direction, and the time the mirror reaches the end point of its travel in that direction. A second time period is measured out, beginning from the time the mirror reaches its travel end point, and production of modulated optical energy is allowed to proceed at the completion of the second time period which is made equal to the measured first time period. Digital and analog embodiments are disclosed.

18 Claims, 11 Drawing Figures

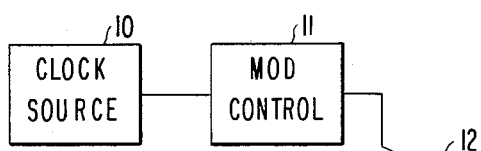
FIG.1
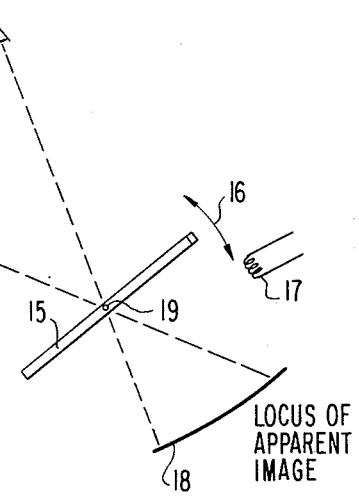
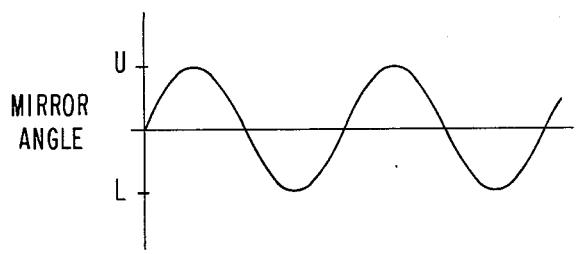
FIG.2
FIG.3
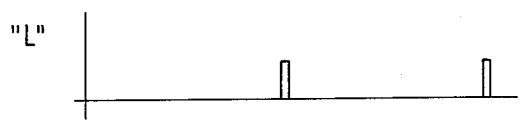
FIG.4
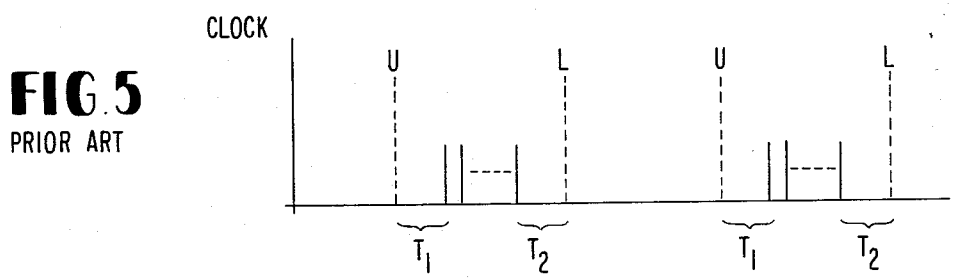
FIG.5
PRIOR ART
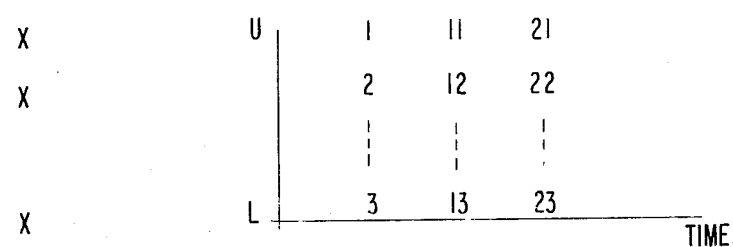
FIG.6A
PRIOR ART
FIG.6B
PRIOR ART

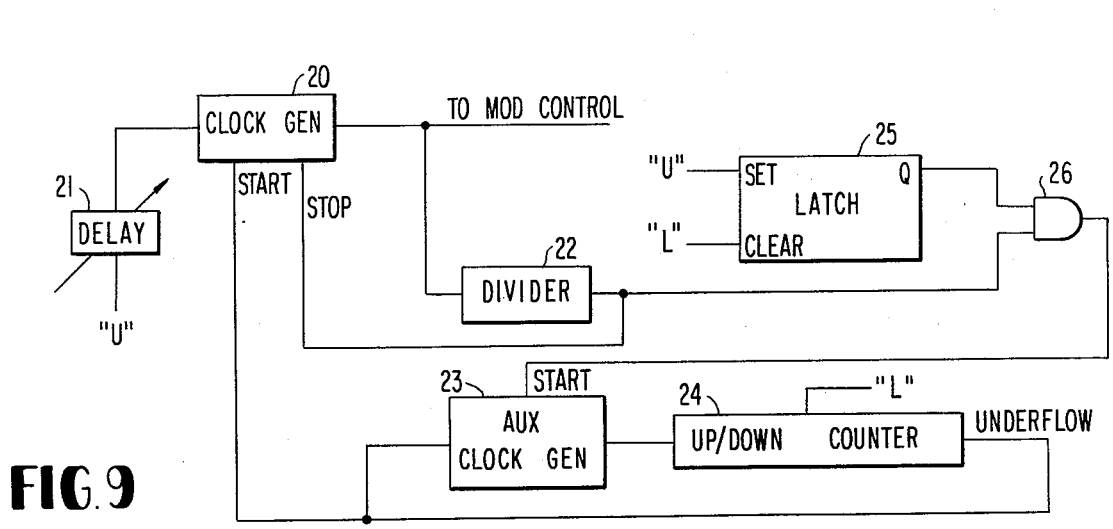
FIG.7
FIG.8
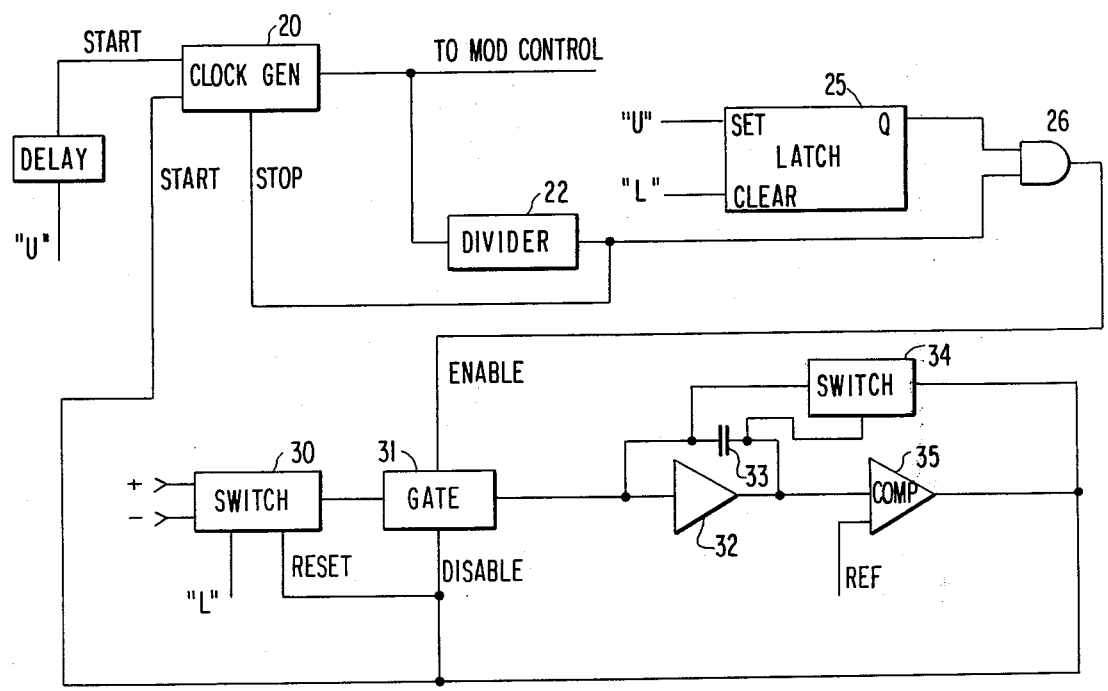
FIG.9
FIG.10

SYNCHRONIZATION FOR OSCILLATING OPTICAL BEAM DEFLECTING DEVICE

FIELD OF THE INVENTION

The present invention relates to synchronizing apparatus for use with systems including an oscillating beam deflecting device.

BACKGROUND OF THE INVENTION

Oscillating beam deflecting devices have been used, in the prior art, in a variety of embodiments. Typical apparatus is disclosed in U.S. Pat. No. 3,886,309 and 3,876,829. Disclosed in the referenced patents are display or image creating systems which include an oscillating mirror for deflecting a modulated optical beam from a source of such beam to an image area or a display area. The apparatus disclosed in the referenced patents are typical in that the oscillating mirror oscillates, of course, in two directions; however, only one direction of mirror oscillation is actually employed for deflection or reflection of the modulated optical beam, and the oscillation of the mirror in the other direction is unused and is considered analogous to the dead time encountered in a CRT flying spot scanner which is commonly referred to as the retrace time. Those skilled in the art will readily appreciate that the ability to utilize the retrace or deadtime in such a device is a desirable feature.

One solution in an optical scanning environment which is directed at a problem which has some similarities to the problem to which this invention is directed, is disclosed in U.S. Pat. No. 3,848,087. Although that patent is concerned with a rotating beam deflecting device, such as a rotating polygonal mirror, rather than an oscillating beam deflecting device, the patentee overcomes variations in mirror facet size and orientation by controlling the motor driving the beam deflecting device. While this particular solution may fit with the needs of the patentee, in general, apparatus in which control is exercised over the travel or velocity of the beam deflecting device to insure superimposition of images in a display system is to be avoided. The reason that solutions of this sort are not favored is that it is generally much more difficult to accurately control the positioning and/or the velocity of a mechanical system such as that represented by the rotating polygonal mirror, than it is to control some purely electronic device.

One reason for the failure, in the prior art, to use the time during which the mirror is returning to an initial position for actually creating an image or a portion thereof, has been the difficulty in synchronizing the beam source with the mirror, so that the beam scanned in one direction overlies or is superimposed upon the beam scanned in the opposite direction. This criteria is required for otherwise the image, for example, in a display system will be blurred. Typically, images are formed, for example, in a dot wise format, each dot being defined by a pulse produced by an oscillator or clock. In order to use mirror travel in both directions for beam reflection, some way must be found of assuring that the angle the mirror makes with the optical source when the last "dot" is written, is reproduced after the mirror has reversed its travel and the beam is now being scanned in the opposite direction. Significant advantages accrue from double direction scanning, for example, brightness is increased as well as flicker frequency.

While the foregoing discussion is specific to an oscillating mirror (thereby implying an optical beam), those skilled in the art will appreciate that similar requirements are imposed on any beam deflecting system, i.e., the deflecting device is not necessarily a mirror.

It is therefore an object of the invention to provide, in an oscillating beam deflecting system, synchronizing apparatus to assure that a beam scanned in one direction of motion of the beam deflecting device will overlie or be superimposed over the beam scanned in the other direction of motion of the beam deflecting device. It is another object of the invention to provide synchronizing apparatus for an oscillating mirror in a display device to assure that an image created during mirror travel in one direction overlies or is superimposed on an image created by the travel in the opposite direction. It is another object of the present invention to provide such a device which does not rely for operability upon the ability to control mirror motion, but which rather has the ability to conform to variations in mirror motion.

SUMMARY OF THE INVENTION

The present invention meets these and other objects in the manner set forth in more detail below. More particularly, a synchronizing apparatus is provided for a beam scanning system in which a modulated energy beam is scanned across a given area by means of an oscillating beam deflecting device, the given area being included within a larger area scanned by the beam deflecting means within a pair of travel end points, as the beam deflecting means scans in one direction and another. First and second signals are produced at first and second travel end points of the beam deflecting means in its oscillatory movement. A source of modulated energy is enabled responsive to said first signal and the source is disabled when the beam deflecting means has travelled through an arc sufficient for the deflected modulated energy to scan through the desired scanned area. Means are provided for measuring a first predetermined time between the operation of the means for disabling and production of the second signal. Also provided is a timer for measuring a second interval of time equal to the first interval of time; the second interval of time is measured from the production of the second signal, i.e., at the time the beam deflecting means reverses its direction. Finally, means are provided for enabling the source of modulated energy at the conclusion of the second time period.

The invention also includes a specific embodiment wherein the display system has a display written by modulated optical energy reflected from an oscillating mirror during mirror travel in one direction between first and second mirror travel end points, said modulated optical energy produced from a source thereof, in response to a signal demarking the mirror reaching a first mirror travel end point, the modulated optical energy culminating before the mirror reaches the second mirror travel end point. The invention specifically provides a synchronizing system to allow writing the display during mirror travel in the other direction opposite to the one direction in a fashion that superimposes images written during mirror travel in said another direction with images written during travel in the one direction. The oscillating mirror includes a permanent magnet located at one extremity thereof, and a coil is located to respond to changes in a magnetic field produced by the magnet. The coil produces a generally sinusoidal voltage which goes through zero when the mirror reaches a mirror travel end point. Signal processing circuitry is provided to produce a pulse corresponding to first and second end points in the mirror travel. A time measuring device is provided for measuring the time extending from cessation of writing, during mirror travel in one direction, until the mirror reaches the next travel end point. Second timing means is provided to measure out a time period equal to the first time period. Finally, apparatus is provided responsive to the expiration of the second time period for enabling production of the modulated optical energy.

BRIEF DESCRIPTION OF THE DRAWINGS

The present invention will now be described with particular reference to a preferred embodiment in the following portions of the specification when taken in conjunction with the attached drawings in which like reference characters identify identical apparatus and in which:

FIG. 1 is a block diagram of an oscillating mirror display system;

FIG. 2 is a graphical representation of mirror angle as a function of time;

FIGS. 3 and 4 show the time relationship between several pulses employed in the apparatus with mirror angle;

FIG. 5 and FIGS. 6A and 6B illustrate operation of a typical prior art system;

FIGS. 7 and 8 are corresponding views of apparatus in accordance with the present invention;

FIG. 9 is a block diagram of digitally operated apparatus in accordance with the present invention; and FIG. 10 is a block diagram of analog apparatus in accordance with the teachings of the invention.

DETAILED DESCRIPTION OF THE INVENTION

FIG. 1 is an example of a beam deflection system employing the principles of the present invention. As shown, a clock source 10 drives a modulator control 11 and is coupled to an optical beam source 12. When clock pulses from the clock source 10 are provided to the modulator control 11, the modulator control 11 modulates the optical output of the optical source 12 in accordance with some intelligence, the source of which is not illustrated. A reflecting device or mirror 15 oscillates about an axis 19 (perpendicular to the plane of the paper) in the direction shown by the double headed arrow. Preferably the mirror 15 carries, on at least one end thereof, a permanent magnet 16 which, in combination with the coil 17, can be used to generate pulses identifying first and second end points of the mirror travel. An optical beam incident on the mirror 15, from a source 12, can be reflected to an observer. As the angle of the mirror varies, so will the apparent location of the image source 12 vary. The locus of apparent sources as viewed by the observer, is illustrated at 18. Thus, as the mirror oscillates, a modulated optical beam from source 12 will scan the area 18.

Those skilled in the art will appreciate that much the same action can be effected with an oscillating beam deflector which is not necessary a reflector such as the mirror 15. Further, the deflector 15 can be eliminated, and the source 12 oscillated directly.

FIG. 2 illustrates mirror angle as a function of time from some mirror travel end point U, to another mirror travel end point L. With the permanent magnet 16 located on the mirror 15, and oscillating therewith, the coil 17 will produce a voltage similar to that shown in FIG. 1. Conventional signal processing allows pulses to be produced at the time of the zero crossings of this voltage. U pulses (shown in FIG. 3) identify the time when the mirror is at one end point in the mirror travel, and pulses L (shown in FIG. 4) identify when the mirror is at another end point of mirror travel.

In order to produce a waveform such as that shown in FIG. 2, the coil 17 is arranged, relative to the arc swept out by the permanent magnet 16, so that the magnet 16 does not reach the coil midpoint. If the magnet 16 traces out an arc which has an end point in the vicinity of the midpoint of the coil 17 then a double frequency sinusoid is produced, and one then has the problem of selecting the correct zero crossing to identify the zero velocity times.

FIG. 9 is a block diagram of one embodiment of the invention. As illustrated, a variable delay 21 couples the U pulse to a START input of a clock generator 20. When enabled, clock generator 20 supplies clock pulses to the modulator control 11 (FIG. 1). An input of a divider 22 is coupled to the output of clock generator 20. Divider 22 is arranged to divide by the number of pulses produced in one scan. Those skilled in the art will understand that, instead of divider 22, a myriad of other devices could be used to perform a similar function, for example, a preset counter which counts up or down to a selected count, as determined by a comparator, could also be employed. In any event, when the given number of pulses contained in a single scan has been produced, divider 22, or the equivalent, produces an output pulse which is coupled back to the clock generator 20 to its STOP input to terminate the output of the clock generator 20. Latch 25, during the scan from U to L, is in the set condition providing an enabling input to gate 26. The output of divider 22 is coupled through gate 26 to a START input of auxiliary clock generator 23. Responsively, the auxiliary clock generator 23 begins producing output pulses which are coupled to an up/down counter 24. Prior to the production of the L pulse, the counter counts in one direction, for example, up from a count of zero. On occurrence of the L pulse, the counter 24 switches its direction of counting and begins counting down, for example. When the counter reaches zero and begins to underflow, an output is produced on the line labelled UNDERFLOW, which is coupled to the STOP input of the auxiliary clock generator 23 and is also coupled to another START input of clock generator 20. As will be apparent, the L pulse also clears the latch 25 so that, on the reverse scan, the auxiliary clock 23 will not be enabled. Thus, the auxiliary clock 23 and counter 24 are only enabled at the end of a scan in one direction.

Operation of the circuit illustrated in FIG. 9 is initiated by production of a U pulse at the time that the mirror reaches one end point of its oscillatory travel. As the mirror changes direction and begins moving in the opposite direction, the U pulse traverses the variable delay 21 and, when it is output from the delay 21, it enables the clock generator 20. Clock generator 20 therefore begins producing pulses at a predetermined rate which are supplied to the modulator control 11 so as to allow the optical beam generator 12 to produce optical pulses at a predetermined repetition rate in accordance with the signals provided by the modulator control 11. At the same time, the divider 22 (or similar apparatus) monitors the pulses produced by the clock generator, and after a predetermined number of these pulses, for example, the number of pulses employed in one "scan" an output is produced which disables the clock generator 20 from producing further pulses. Simultaneously, however, the auxiliary clock generator 23 is enabled through enabled gate 26 and it produces pulses at a second predetermined rate which, as will be explained below, is preferably at a higher rate than the rate of pulses produced by the clock generator 20. Up/down counter 24 therefore begins counting preferably from zero. At this point in time, mirror 15 is reaching its other travel end point, and when that point is reached, and the mirror again reverses direction, the L pulse is produced switching the action of the counter 24 so that it now counts down from the count it reached in counting up. After a sufficient number of pulses from the auxiliary clock generator 23 have been produced to count the counter 24 back down to zero, the next pulse from auxiliary clock generator 23 causes the counter to underflow, producing an output pulse to both disable the auxiliary clock generator 23 and enable clock generator 20. The L pulse also clears latch 25 so that similar action does not occur when the mirror reaches its first travel end point.

FIGS. 5, 6A, and 6B illustrate operation of prior art apparatus which scans in only a single direction. FIG. 5 illustrates the production of several pulses, in time sequence from clock generator 20. The first event noted is production of a U pulse corresponding to the mirror beginning its movement in one direction. After a time delay T1, the clock produces pulses identified by short vertical strokes. Each pulse represents a potential dot in a line of dots, and the information controlling the modulator determines whether or not a dot is to be produced at the times defined by the output of the clock. After a predetermined number of clock pulses have been produced, the scan ends, but the mirror continues in its motion for a time T2 after the last clock pulse. At the end of the period T2, the mirror has reached its travel end point, producing the L pulse. The mirror now reverses direction and, as illustrated in FIG. 5, the clock does not produce any pulses during the time the mirror travels in the reverse direction. Subsequently, a U pulse is produced and the preceding action is repeated. The visual effect is, as illustrated in FIG. 6A, wherein a line of dots (represented by x's) are illustrated. FIG. 6B illustrates the effect of several different scan lines as a function of time between the U and L positions of the mirror. Various dots 1–3, 11–13, 21–23, etc., produced in different scans, are displaced horizontally for illustrative purposes, but that is not an essential feature of the devices although in some instances, it may be desirable. The numbers 1–23 identify different dots making up a scan line, and they are numbered in order of their production, that is, dot 2 is produced before dot 3 and dot 11 is produced before dot 12. Thus, FIG. 6B illustrates that the device scans always in the same direction, as illustrated, from top to bottom, although scanning in the reverse direction is also possible. However, the prior art is confined to scanning in only a single direction.

FIGS. 7 and 8 correspond to FIGS. 5 and 6B, although they illustrate operation of the inventive arrangement. More particularly, as shown in FIG. 7, after a delay period T1, following production of a U pulse, the clock produces a series of pulses, again illustrated by short vertical strokes. The L pulse is produced, a delay T2 after the last clock pulse in the scan. The mirror then reverses its direction and, a predetermined time T3 after production of the L pulse additional clock pulses are produced. A similar delay T4 exists after the last of the clock pulses in the opposite scan before production of the U pulse. Following production of the U pulse, the operation is repeated.

Referring back now to FIG. 9, it should be apparent that the auxiliary clock generator 23 is initiated at the beginning of the period T2 and operates until termination of the period T3. The up/down counter 24, however, counts up prior to the production of the L pulse, and is reversed by that pulse so that it counts down thereafter (or vice versa). The operation of the auxiliary clock generator 23, up/down counter 24 insures, however, that the period T2 is equal to the period T3. If we refer now to FIG. 8, we see that the first scan line produced by the device scans down, whereas the next scan line scans up, and so on. The apparatus of the invention insures the dot identified by reference character 11 overlies or is superimposed on the dot identified by reference character 3. This is so because the delay T2 is a measure of the actual distance between the dot identified as 3 and the reference line L, and operation of the apparatus insures that the dot identified as 11 is the same distance therefrom. The combination of the auxiliary clock generator 23 and up/down counter 24 in effect first measures the delay T2 and then forces the delay T3 to be equal, and thus insures that the line scan in one direction overlies or is superimposed on the line scanned in the opposite direction. The clock generators 20 and 23 may comprise oscillators of the START/STOP type which can be enabled by a signal on one terminal and disabled by a signal on another terminal. On the other hand, the clock generators may include a free running oscillator with appropriate gating so that in response to, for example, a START signal, the gate is enabled to pass clock pulses, and in response to a STOP signal, the gate is disabled, thereby preventing oscillator pulses from reaching associated apparatus.

The use of scanning in both directions without the apparatus for measuring T2 and making it eqaul to T3 is extremely sensitive to any errors or long term drifts in the relative frequency between the clock source and the mirror motion. Thus, assume that each bi-directional scan is started by the U pulse, and assume N dots per scan. The first and last dots of a complete sequence will coincide within a fraction E of an interdot space only if the relative frequencies between the clock source and the mirror are correct to a fractional accuracy E/N. Thus, if we assume practical parameters such as N = 100 and E = 0.05, an accuracy for the relative frequencies is 0.05%. While this can be done, albeit with difficulty, by phase-locking the clock source and mirror, it becomes increasingly difficult as N increases.

By using the inventive apparatus, however, no such close control of the clock source relative to mirror motion is required. However, there is a constraint, namely, the auxiliary clock generator 23 should have a frequency at least equal to two N/E times the frequency of the main oscillator in order to prevent quantization errors from producing dot misalignment greater than E.

Typical parameters for the frequency of the clock 20 and 23 are, for example, between 10 and 50 kilocycles for clock 20 and one mHz. or higher for clock 23.

Those skilled in the art will realize that the use of two different clocks is not an essential feature, but instead, a single clock can be employed with a frequency divider to produce an input to the modulator control 11 and the undivided output of the oscillator can be employed for the clock 23. Furthermore, the apparatus for measuring the times T2 and T3 need not be digital at all, and may instead comprise analog apparatus as is disclosed below.

The delay 21 in effect determines the period T1 (see FIG. 5 or 7) enabling direct, for example, manual control over delay 21 enables the image to be centered, by manually controlling T1 to be equal to T2.

The foregoing embodiment includes a digital circuit to measure T2 and T3, but that is not an essential feature of the invention and the functions can instead be carried out in an analog fashion in the manner shown in FIG. 10. As shown in FIG. 10, the clock generator 23 and divider 22 are similar to that apparatus of FIG. 9. Instead of the auxiliary clock generator 23, an up/down counter 24, an integrator is provided and driven by one or another potentials so that instead of counting up, the integrator integrates in one direction, and instead of counting down, the integrator integrates in the opposite direction. A comparator determines when the integrator output passes through zero, or some other appropriate reference level to enable clock generator 20. In this fashion, the delays T2 and T3 are made equal.

More particularly, a switch 30 has applied to it appropriate (equal) potentials of different polarity. The output of switch 30 is provided to gate 31, the output of gate 32 is provided as an input to an integrator comprising an operational amplifier 32 and a capacitor 33. For resetting purposes of a switch 34 (such as an FET switch) is coupled in parallel to the capacitor. The output of the integrator is provided as one input to a comparator 35 which may also be supplied with a reference potential. The comparator output is provided as a disabling input to gate 31 and a resetting input to switch 30 as well as providing a START signal to the clock generator 20.

At the conclusion of writing a particular scan line, the output of divider 22 may enable gate 31 through enabled gate 26 to pass the potential provided by the switch 30 to begin operating the integrator. By the time the L pulse is produced, the integrator has produced a voltage which is a measure of the period T2. Production of the L pulse switches the output of switch 30 to provide a potential of opposite polarity through gate 31 to the integrator 32. Accordingly, the integrator voltage now decreases, at the same rate that it previously increased. When the integrator output voltage goes to zero, the comparator 35 produces an output pulse to disable the gate 31 and reset the switch 30, at the same time starting the clock generator 20 and also operating switch 34 to short the capacitor. With such arrangement the reference potential supplied to the comparator would be a ground potential. On the other hand, if desired, the integrator could be arranged to initiate its operation from some predetermined reference level which then would be the reference level applied to the comparator 34. The L pulse also serves to clear latch 25 to insure the foregoing operations are only performed on alternate scans.

What is claimed is:

1. In a beam scanning system in which modulated energy is scanned across a given area by means of an oscillating beam deflecting means said given area included within a larger area scanned by said beam deflecting means within a pair of travel end points of said beam deflecting means, an improved synchronizing system to assist in superimposing an image created by a beam scanned in one direction with an image created by a beam scanned in another direction, opposite to said one direction, said improved synchronizing system comprising:
   means for producing first and second signals, respectively, at first and second travel end points of said beam deflecting means,
   a source of modulated energy enabled responsive to said first signal,
   means for disabling said source when said beam deflecting means has travelled through an arc sufficient for said deflected modulated energy to scan through said given area,
   means for measuring a first period of time between operation of said means for disabling and said second signal,
   timing means for measuring a second period of time, equal to said first period of time, and
   means for enabling said source at the conclusion of said second time period.

2. The apparatus of claim 1 wherein said modulated energy is binary in form producing, during said scan, a dot image.

3. The apparatus of claim 1 wherein said means for producing first and second signals comprises at least a permanent magnet mounted on said beam deflecting means and a coil for producing the voltage in response to movement of said permanent magnet.

4. The apparatus of claim 1 wherein said source of modulated energy includes a START/STOP oscillator, enabled responsive to said first signal and disabled by said means for disabling.

5. The apparatus of claim 1 wherein said source of modulated energy includes a free-running oscillator and a gate connected therewith, said gate enabled by said first signal, and disabled by said means for disabling.

6. The apparatus of claim 1 wherein said means for measuring comprises a bi-directional counter and a source of pulses, said bi-directional counter counting pulses from said source beginning with operation of said means for disabling and terminating with said second signal,
   means for reversing said bi-directional counter's direction of counting in response to said second signal included within said timing means for measuring a second period of time, and further including means for producing a signal at the end of said second period of time.

7. The apparatus of claim 6 wherein said source of pulses includes an oscillator, said source of modulated energy coupled to said oscillator through a frequency divider.

8. The apparatus of claim 6 wherein said source of modulated energy includes an oscillator, and said source of counting pulses provides counting pulses higher than the frequency of said oscillator included within said source of modulated energy.

9. The apparatus of claim 1 wherein said means for measuring includes an integrator and a source of energy of one polarity, said source of energy of one polarity coupled to said integrator contemporaneous with operation of said means for disabling;
   said timing means including said integrator and a source of energy of polarity different than said polarity of said energy source and means for coupling said means for enabling, operating when an output voltage of said integrator returns to a reference potential.

10. In a display system in which a display is written by modulated optical energy reflected from an oscillating mirror during mirror travel in one direction between first and second mirror travel end points, said modulated optical energy produced from a source thereof in response to a signal demarking said mirror reaching said first mirror travel end point, said modulated optical energy terminating before said mirror reaches said second mirror travel end point, a synchronizing system to allow writing said displays during mirror travel in another direction, opposite the said one direction, in a fashion that superimposes images written during mirror travel in said another direction on images written during travel in said one direction, said synchronizing system including:

means for producing a first signal at said second mirror travel end point,
  means for measuring a first time period extending from cessation of writing to production of said first signal,
  means for timing a second time period equal to said first time period, and
  means responsive to expiration of said second time period for enabling production of said modulated optical energy.

11. The apparatus of claim 10 wherein said modulated energy is binary in form producing, during said scan, a dot image.

12. The apparatus of claim 10 wherein said means for producing first and second signals comprises at least a permanent magnet mounted on said beam deflecting means and a coil for producing the voltage in response to movement of said permanent magnet.

13. The apparatus of claim 10 wherein said source of modulated energy includes a START/STOP oscillator, enabled responsive to said first signal and disabled by said means for disabling.

14. The apparatus of claim 10 wherein said source of modulated energy includes a free-running oscillator and a gate connected therewith, said gate enabled by said first signal, and disabled by said means for disabling.

15. The apparatus of claim 10 wherein said means for measuring comprises a bi-directional counter and a source of pulses, said bi-directional counter counting pulses from said source beginning with operation of said means for disabling and terminating with said second signal, means for reversing said bi-directional counter's direction of counting in response to said second signal included within said timing means for measuring a second period of time, and further including means for producing a signal at the end of said second period of time.

16. The apparatus of claim 15 wherein said source of pulses includes an oscillator, said source of modulated energy coupled to said oscillator through a frequency divider.

17. The apparatus of claim 15 wherein said source of modulated energy includes an oscillator, and said source of counting pulses provides counting pulses higher than the frequency of said oscillator included within said source of modulated energy.

18. The apparatus of claim 10 wherein said means for measuring includes an integrator and a source of energy of one polarity, said source of energy of one polarity coupled to said integrator contemporaneous with operation of said means for disabling;

said timing means including said integrator and a source of energy of polarity different than said polarity of said energy source and means for coupling said means for enabling, operating when an output voltage of said integrator returns to a reference potential.

* * * * *

UNITED STATES PATENT AND TRADEMARK OFFICE
CERTIFICATE OF CORRECTION

PATENT NO. : 4,122,494
DATED : October 24, 1978
INVENTOR(S) : James L. Levine

It is certified that error appears in the above-identified patent and that said Letters Patent are hereby corrected as shown below:

In column 6, line 40, correct the spelling of "equal";

in lines 50 and 51, change "0.05" to --.05--.

In column 7, line 26, change "32" to --31--;

in line 28, delete "of".

Signed and Sealed this

Third Day of April 1979

[SEAL]

Attest:

RUTH C. MASON
Attesting Officer

DONALD W. BANNER
Commissioner of Patents and Trademarks